Nov. 29, 1966 LE ROY S. HARRIS 3,287,970
LINEARITY ADJUSTMENT MEANS FOR METERS
Original Filed Dec. 3, 1958 3 Sheets-Sheet 1
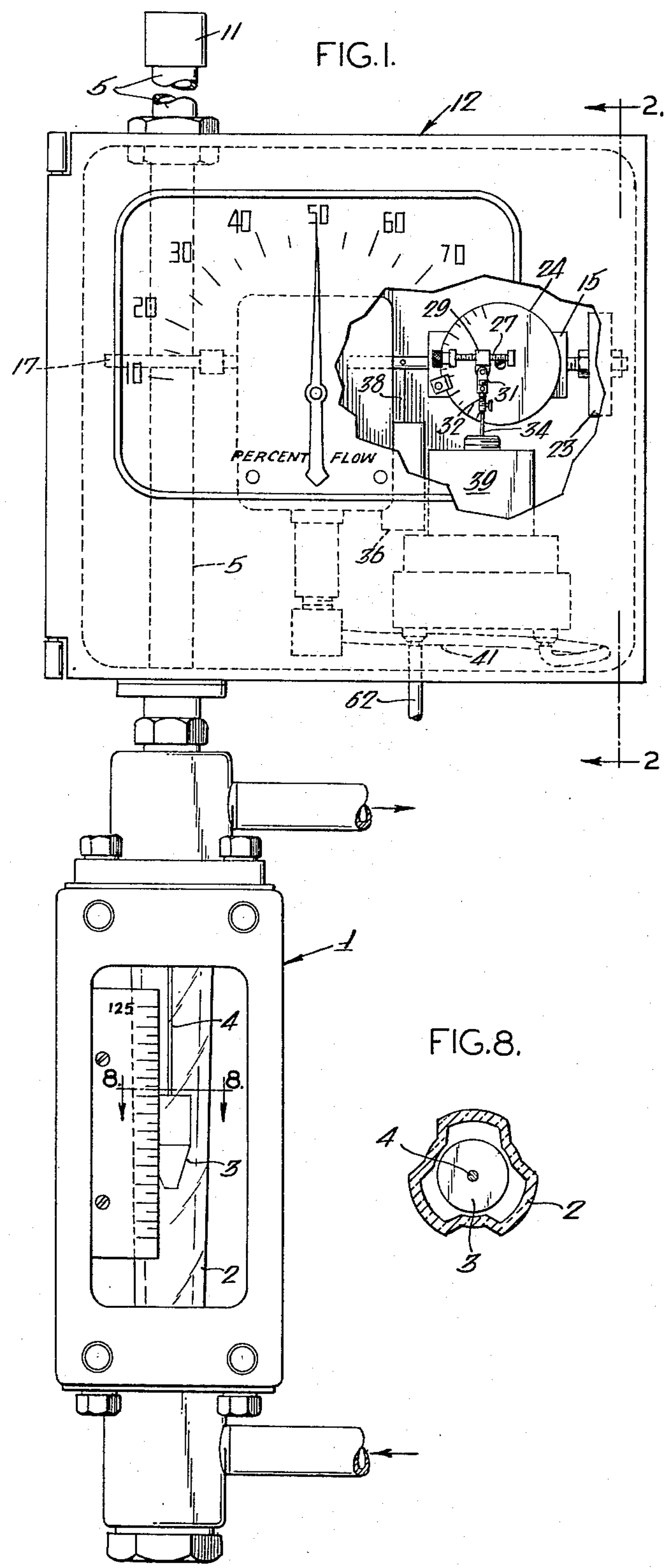
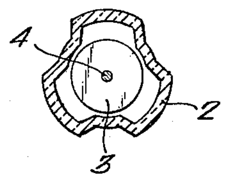
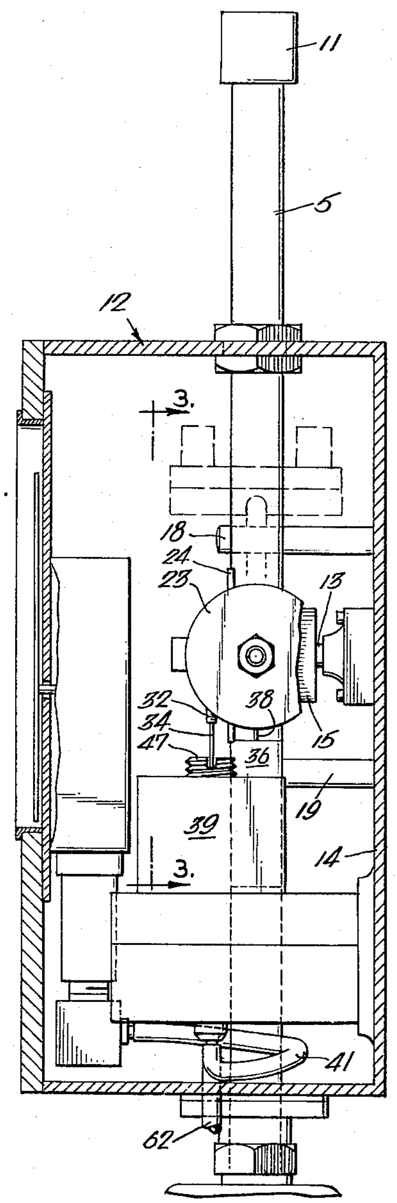
INVENTOR:
LEROY S. HARRIS
BY *Howson & Howson*
ATTYS.

LINEARITY ADJUSTMENT MEANS FOR METERS

Original Filed Dec. 3, 1958 3 Sheets-Sheet 2

INVENTOR:
LEROY S. HARRIS
BY Howson & Howson
ATTYS.

Nov. 29, 1966 LE ROY S. HARRIS 3,287,970
LINEARITY ADJUSTMENT MEANS FOR METERS
Original Filed Dec. 3, 1958 3 Sheets-Sheet 3
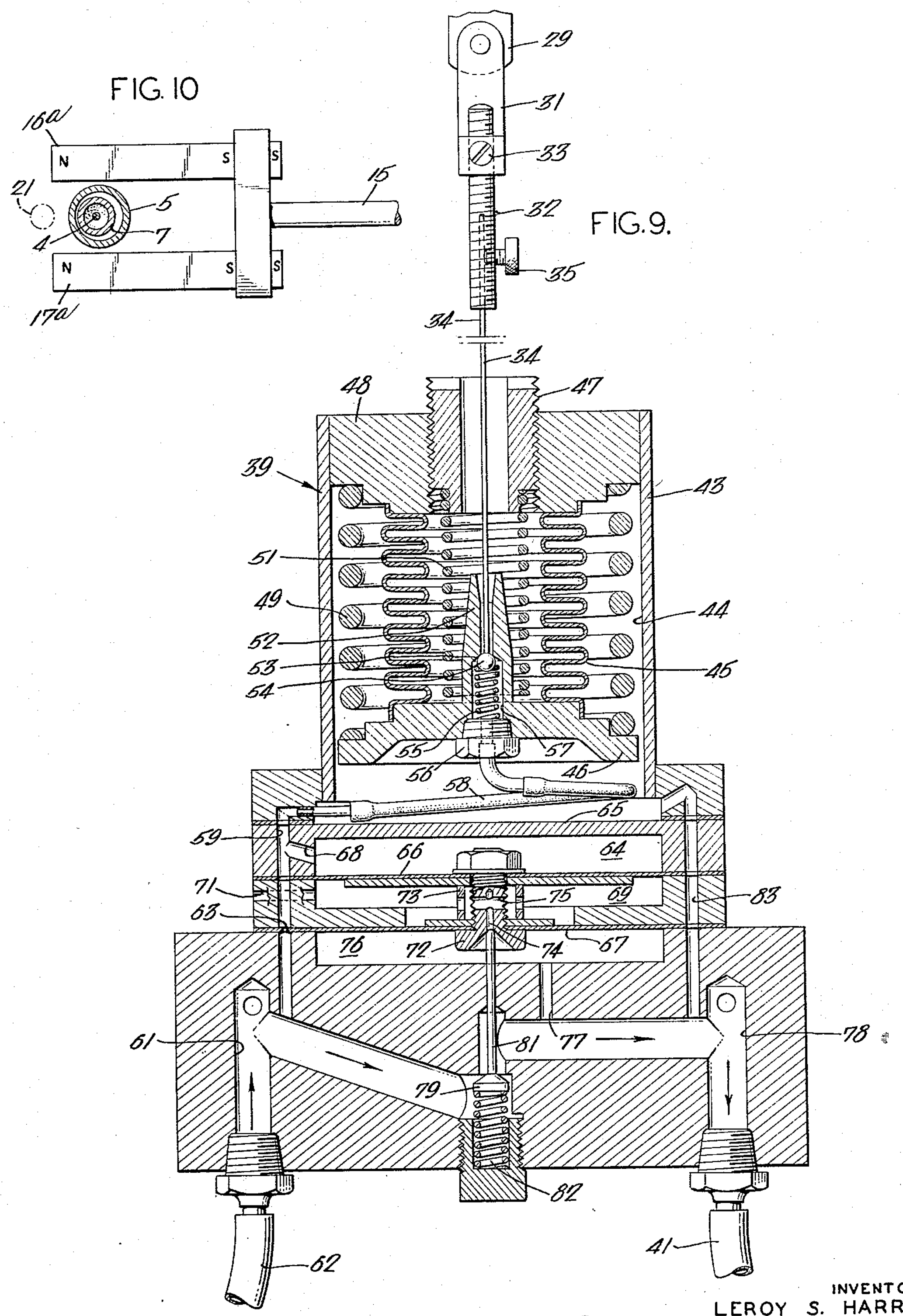
INVENTOR:
LEROY S. HARRIS
BY Howson & Howson
ATTYS 3,287,970

LINEARITY ADJUSTMENT MEANS FOR METERS

Le Roy S. Harris, Huntingdon Valley, Pa., assignor to Schutte and Koerting Company, Cornwells Heights, Pa., a corporation of Pennsylvania Original application Dec. 3, 1958, Ser. No. 777,998, now Patent No. 3,137,165, dated June 16, 1964. Divided and this application Sept. 16, 1963, Ser. No. 308,933
4 Claims. (Cl. 73—209)

This application is a division of my co-pending application Serial No. 777,998, filed December 3, 1958, now Patent Number 3,137,165, dated June 16, 1964.

This invention has for an immediate object the provision of an improved device for transmitting motion from the movable element of a measuring instrument, such, for example, as the rotor of a rotameter, to a remote receiver which may take the form variously of a guage, indicator, recorder, controller or the like to indicate, record or control the position of a movable element.

More specifically the invention relates to improvements in that class of transmitting device wherein transmission is effected through the medium in part of a pneumatic transmitter and in part of a magnetic coupling, both of improved design and operating characteristics, and both contributing materially to the relative simplicity and economical design of the apparatus.

The invention contemplates also, as an element of the device as a whole, an improved and simplified mechanical linkage between the said coupling and the pneumatic transmitter.

Another object resides in the provision in the device of plural means for adjustment affording a relatively high degree of flexibility and accuracy in linearity control, as hereinafter described.

While the invention has numerous applications, its nature and several objectives can be well understood from its application to rotameters, and in the attached drawings:

FIG. 1 is a front elevational view partially in section of a rotameter provided with transmission means in accordance with the invention;

FIG. 2 is a sectional view on enlarged scale on the line 2—2, of FIG. 1;

FIG. 8 is a sectional view on enlarged scale on the line 8—8, FIG. 1;

FIG. 9 is a vertical sectional view on enlarged scale through the pneumatic transmitter, and FIG. 10 is a sectional view corresponding to FIG. 6, but illustrating a modified magnetic coupling within the scope of the invention.

Figure 3:
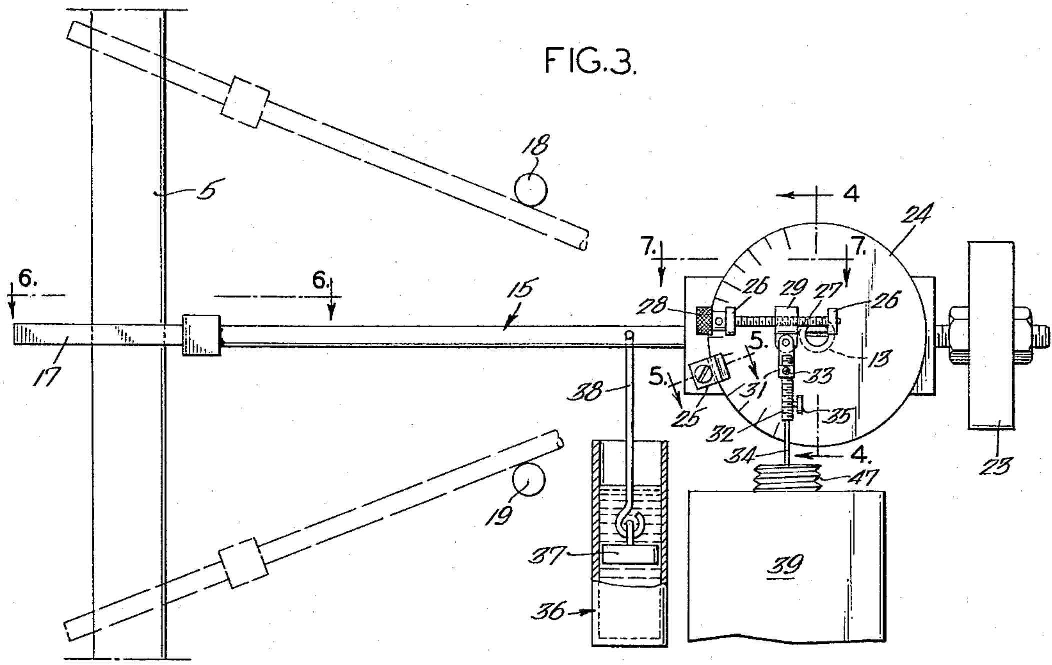
FIG. 3 is a fragmentary sectional view on enlarged scale on the line 3—3, FIG. 2.

With reference to the drawings, the rotameter is indicated by the reference numeral 1. The meter comprises the usual flow tube 2 and rotor 3 and may for the purposes of the present description be considered conventional. From the rotor 3 a rod 4 extends upwardly into a tube 5 and carries at its upper end a bar magnet. The length of this magnet is equal to or slightly longer than the stroke of the rotor 3. In the present instance, this magnet is contained within a tubular casing 7 of smaller outside diameter than the inner diameter of the tube 5. A second rod extends upwardly in the casing 7 from the upper end of the first magnet and acts as a spacer of length equal to or slightly greater than the stroke of the rotor for the short magnet in the upper end of the casing. This is all illustrated in my prior co-pending application referred to above. The tube 5 extends upwardly beyond the upper end of the casing 7 so as to afford ample clearance for movement of the casing within the range of movement of the rotor 3. The upper end of the tube 5 is closed, in the present instance, by a cap 11. It will be apparent that the position of the two magnets is a function of the position at any moment of the rotor 3 within the rotor tube 2. The polarity of the upper magnet is such that oppositely charged poles of the two magnets confront each other. This arrangement affords more magnetic power for a given amount of weight supported by the rotor when a simple balanced single arm follower, of the type hereinafter described, is used to support the mating magnetic members of the coupling.

Figure 6:
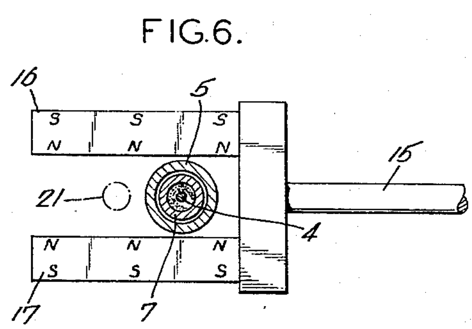
FIG. 6 is a sectional view on enlarged scale on the line 6—6, of FIG. 3.

In the present instance, the portion of the tube 5, which contains the magnets and within which the said magnets move occupies a position within a housing 12. Pivotally supported on a pin 13 which projects from a wall 14 of the housing 12 is an arm 15. This arm carries at one end a pair of magnets 16 and 17, spaced apart as illustrated in FIG. 6 and lying one at each side of the tube 5. The polarity of these magnets, which are rectangular in cross section, is indicated in FIG. 6 by the letters N and S, and it will be noted that the inner longitudinal edges, i.e. the edges which confront the tube 5, are throughout their lengths of the same polarity, north in the present instance, whereas the outer longitudinal edges are of opposite polarity. Under these circumstances, a magnet coupling exists between the magnets within the tube 5 and the magnets 16 and 17 whereby movement of magnets within the tube longitudinally will be transmitted through the magnets 16 and 17 to the arm 15.

Stops 18 and 19 limit the angular displacement of the arm 15 about the axis of the pin 13, and this limited angular displacement is related to the range of movement of the rotor 3 in normal operation of the rotometer so that the inner and outer ends of the magnets 16 and 17 will always lie in coupled relation with the magnets in the tube, regardless of the position of the latter within the normal range of the rotor. The relative positions of the magnets 16 and 17 and of the magnets within the tube when the arm 15 is in the position of maximum elevation against the stop 18, and when the arm 15 is against the stop 19 is indicated at 21. Thus in any angular position of the arm 15, the magnets within the tube will lie between the magnets 16 and 17 and will be coupled magnetically to the latter. Also in any position the magnetic force of the coupling will be constant and there is a complete absence of side thrust on the magnets which reduces to a minimum frictional side force reaction between magnets within the tube and the tube 5. This reduces hysteresis in and increases sensitivity of the system.

Figure 4:
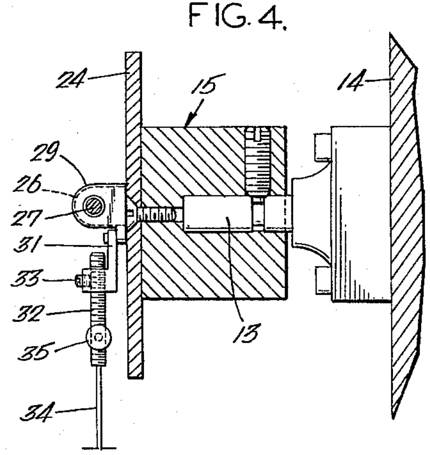
FIG. 4 is a sectional view also on enlarged scale on the line 4—4, FIG. 3.
Figure 7:
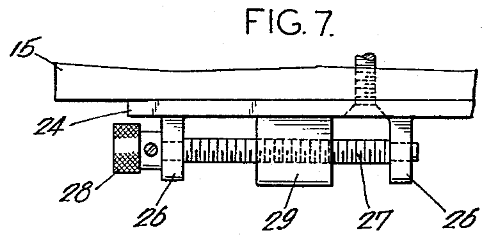
FIG. 7 is a fragmentary plan view from the line 7—7, FIG. 3, showing a detail of the linkage.
Figure 5:
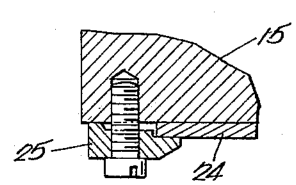
FIG. 5 is a sectional view on enlarged scale on the line 5—5, FIG. 3.

The arm 15 carries at its opposite end, i.e., the end relatively remote to the magnets, an adjustable counter weight 23. Attached to the arm in concentricity with the axis of the pin 13 is a calibrated disc 24, this disc being adjustable angularly on the rod about the said axis and being locked in adjusted position by a clamp 25, as shown in FIG. 5, which may be released for adjustment of the disc as required. Mounted in bosses 26, 26 on the disc 24 for rotation about its own axis is a threaded shaft 27. This shaft can be rotated manually through the medium of a knurled head 28. Carried by the shaft 27 in threaded engagement therewith is a block 29, the rear face of which rests slidably against the face of the disc 24 as best shown in FIG. 4. The block 29 may be adjusted longitudinally of the screw 27 by rotating the latter. Pivotally suspended from the block 29 is a link 31 into which the upper end of a screw 32 is threaded. This screw may be locked in adjusted position in the link 31 through the medium of a set screw 33. The lower end of the screw 32 is hollow for reception of the upper end of a wire rod 34 which may be secured in the bore of the screw 32 by set screw 35. The function of the rod 34 will be described below.

Connected to the arm 15 at the opposite side of the disc 23 from the counter-weight 23 is a dash pot 36 which in the present instance contains oil or other suitable viscous liquid. Submerged in the liquid is a disc 37, this disc being suspended from an arm 15 by a rigid wire 38. The arm 15 may be balanced on its pin 13 by adjustment of the counter-weight 23 and its angular movements about the axis of the pin 13 are dampened by the dash pot 36.

Rod 34 constitutes the mechanical connection between the arm 15 and a transmitter indicated generally by the reference numeral 39. In the embodiment of the present invention the transmitter is shown as a pneumatic transmitter valve 39, but it will be understood that other forms of a transmitter may be utilized. The pneumatic transmitter valve 39 is operatively connected in turn through a tube 41 with a receiver 42 in the form of a gauge which is calibrated in the present instance in terms of percent flow through the rotameter. As illustrated in FIG. 9, the valve 39 comprises a housing 43 having an upper chamber 44 which contains a flexible bellows 45. The lower end of the bellows is closed by a head 46, and the upper end communicates through an externally threaded hollow sleeve 47 with the atmosphere. The upper end of the chamber 44 is closed by a member 48 which has a threaded opening for reception of the sleeve 47 and in which the said sleeve is adjustable axially for purpose hereinafter described. Confined between the inner face of the member 48 and the bellows head 46 is a spring 49; and a second spring 51 is attached to the inner end of the sleeve 47 and extends downwardly into proximity to the inner face of the head 46. The spring 49 is of greater diameter than and embraces the bellows and so lends stability to the bellows. This affords better repeatability of reading, less hysteresis error, and better linearity characteristics in the spring and bellows combination, as will hereinafter appear. The head 46 has a hollow stem 52 which extends upwardly into the interior of the spring 51, and this stem is formed with a seat 53 for a spherical valve element 54. A spring 55 tends to hold the valve element 54 in seated position, and as illustrated, the rod 34 extends downwardly through the open upper end of the stem 52 for engagement with the sphere 54 under conditions hereinafter described.

The spring 55 is seated on a hollow plug 56 which serves to connect the bore 57 of the stem 52 by way of a flexible tube 58 with a passage 59. This passage extends downwardly through the housing wall to a passage 61 which is connected through a suitable duct 62 to a constant source of pressure air. The passage 59 is restricted by an orifice 63. The passage is connected also, through a port 68, with a chamber 64 formed between the lower wall 65 of the chamber 44 and a flexible diaphragm 66. Between the diaphragm 66 and a second diaphragm 67 of lesser effective area, a chamber 69 is formed which communicates through a port 71 with the atmosphere. The diaphragms 66 and 67 are connected by a bolt 72 and a cylindrical perforated spacer tube 73, and the bolt is provided with passages 74 and 75 immediately below the diaphragm 67. This chamber is connected through a port 77 with a passage 78 which is connected to the duct 41. This passage 78 is connected also to the input passage 61, the connection being controlled by a pressure valve 79 from which a rod 81 extends upwardly to the recessed underside of the bolt 72 and to the lower end of the passage 74, the rod thereby constituting both a means for closing the lower end of the passage 74 and an operative connection btween the diaphragm 67 and the valve 79. A spring 82 tends to retain the valve element 79 in elevated or seated position in which it separates the input and output passages 61 and 78 respectively. The output passage 78 is also connected through a passage 83 witb the chamber 44.

Under normal operative conditions the spherical valve element 54 will be held by the rod 34 in a slightly unseated position. The chamber 44 is exposed to output air pressure through passage 83; and input air will leak in small amount through aperture 63 and tube 58 to the interior of the stem 52 and thence through the valve 54 to atmosphere. The chamber 64 will be subjected through port 68 to pressure of air from the passage 59 above the orifice 63, and the chamber 76 will be subjected to output air pressure through port 77. The valve 79 will be in open position as illustrated and the valve will be balanced. Since the position of the valve element 54 is a function of the position in its tube 2 of the rotor 3 of the rotameter, any variation in flow through the rotameter causing a displacement of the rotor will result in a movement of the valve 54. If, for example, the flow in the rotameter tube increases, the valve 54 will be moved closer to its seat, thereby decreasing the leakage of input pressure air and correspondingly increasing the pressure in chamber 64. This increased pressure applied to the relatively large diaphragm 66 overcomes the balancing pressure of the output air in the chamber 76 acting on the lesser diaphragm 67 and causes a movement of the diaphragm assembly downwardly, with resulting increased opening of the valve 79. This opening movement of the valve 79 increases the output pressure in channel 78 and thereby maintains the desired relationship between the rotameter flow and the output air pressure.

The increased output air pressure is also transmitted through passage 83 to the chamber 44 and is translated into a closing or collapsing movement of the bellows 45. This movement tends to increase the discharge area through valve 54. In effect the closing movement of the valve 54 is followed up by a movement in the same direction as its seat in the stem 52, so that in the final position of the valve the leakage will be such as to afford a pressure in chamber 64 against diaphragm 66 that will balance the augmented output pressure in chamber 76 against diaphragm 67. Should the output pressure at any time exceed the pressure in chamber 64 to a degree such that the differential diaphragm assembly is elevated to an extent closing the valve 79, the upper end of rod 81 will be separated from the lower end of passage 74 and will permit escape of excess air from the output side of the valve to atmosphere through chamber 69.

The increased pressure on the output side of the valve 79 corresponding to the increased flow in the rotameter tube is thus established and maintained. A reverse movement of the rotor by reason of decreased flow in the rotameter tube will result in a downward or opening displacement of the valve 54 and an adjustment of the various elements of the transmitter to decrease the output air pressure to the extent required by the rotor movement and to maintain the necessary balance under the new conditions.

In effect, the valve structure is divided into three sections. The upper section embracing the chamber 44 and the immediately associated elements is a detector section, which detects a movement of the rotor 3 and transmits it in the form of a low pressure signal to the amplifying and valve operating section which consists of the chambers 64, 69, and 76 and the diaphragms 66 and 67. In this section the signal is amplified and used to operate the pressure control valve in the third section, and thus increase or decrease the transmitted output air signal. The transmitted output air signal is then fed back to the position detector and to the valve operator. In effect, the feed back signal tells the valve operator what air pressure it has produced. If it is not the same as that relayed to it from the amplifier, then the feedback signal will drive the valve operator and the valve to the position which will make the output signal the same as the signal from the amplifier. The feed back signal also tells the position detector what transmitted output pressure has been produced. If it is not the correct value corresponding to the position of the mechanical link, then this feed back signal drives the position detector components to a position which will produce a position detector air signal that will in turn produce the correct corresponding transmitted output air signal.

The device is susceptible to highly flexible linearity calibration adjustment, i.e., adjustment to afford an output air signal that is linearly proportional to the measurement being indicated or relayed; in this case the measurement afforded by the position of the rotor 3 of the rotameter. Since the motion of the rotor is not usually linear with respect to the flow quantity, it is necessary, in order to obtain an output air signal from the valve 39 that will be linear with respect to the flow quantity to apply correction between the input motion, i.e., the motion of the rotor and the output air signal. In the present device a linear output signal is made possible through the medium of the several adjustments inherent in the adjustable calibrated disc 24, the screw 32, the screw 27, and the adjustable sleeve 47.

The adjustment of the calibrated disc 24 affords a degree of linearity correction by changing the angular position of the disc and thereby of the screw 27 with respect to the center line of the arm 15. The disc calibrations permit the setting of the disc to a predetermined and defined amount of linearity correction rather than adjusting to the desired correction by trial and error. For applications where the rotameter flow quantity calibration curve is such as to render the linearity adjustment obtainable through the disc 24 incapable of affording the required correction, a second linearity adjustment is provided in the adjustable sleeve 47. Adjustment of this sleeve will bring the spring 51 into operative relation with the bellows so that in a part of the stroke of the bellows the spring participates with the primary spring 52 in supporting the bellows load. Since, under these conditions, the bellows is subjected to two different spring rates over different parts of its stroke length, a non-linear relationship will exist. The additional linearity correction exists when the adjustable spring 51 is active for only some portion of the total working stroke of the bellows 45. By use of this linearity adjustment in conjunction with the linearity adjustment obtained by varying the angular position of the disc 24, various combinations of linearity correction can be obtained to suit the particular requirements. The dual linearity adjusting means also permits more drastic linearity correction than was previously possible. This results from using the two different spring rates for different portions of the working stroke of the bellows, and blending the effects of the two different rates together with a calibration correction using the linkage calibration means.

Range adjustment is accomplished by turning the screw 27. Adjustment of this screw moves the upper end of the link 31 nearer to or further away from the center of rotation of the arm 15. By means of this adjustment, the maximum output air signal is adjusted to correspond to the maximum flow quantity. Zero adjustment is accomplished by lengthening or shortening the link 31, 32. This enables the zero output signal to be adjusted to the zero flow quantity reading of the rotameter.

There may be modification in detail of the apparatus without departure from the scope of the invention as shown, for example, in FIG. 10. In this case the magnetic coupling is identical with the coupling described above and illustrated in FIGS. 3 and 6 with exception only that the magnets 16 and 17 have been replaced by bar magnets **16*a* and 17*a*, which are polarized conventionally at their ends as indicated by the letters N and S representing the north and south poles, respectively. In all other respects the coupling corresponds structurally to the embodiment of FIG. 6 and the corresponding parts are therefore indicated by the same reference numerals. The north poles of the magnets 16*a* and 17*a* are contiguous to the upper end, or south pole, of the rotor extension magnet. This coupling affords a stronger magnetic bond, but at the expense of increased frictional side force reaction between the extension magnet and its confining casing 5, as will be obvious. It is possible also, to use only a single magnet on the rotor extension with consequent weight reduction over the dual rotor extension magnet arrangement illustrated. This requires that the follower arm 15** be operated in a slightly unbalanced condition, however, which results in poorer frequency response characteristics. This feature is advantageous where the amount of weight supported by the rotor is critical.

I claim:

1. In apparatus to detect and indicate quantative measurements comprising, a first element movable in response to change in the quantative measurement to be indicated, a gauging element operable to be moved in response to movement of said first element, transmission means including a pneumatic transmitter connecting said movable element to said gauging element; said pneumatic transmitter comprising a housing having input and output ports connected respectively to a source of pressure air and to a receiver, a valve controlling the connection between said ports and a spring tending to seat said valve, a chamber in said housing, a channel extending from said chamber to the said input port, a restricting orifice in said channel, a second chamber and means for connecting the second chamber to the output port, spaced interconnected diaphragms of differing areas exposed to fluid pressures in said chambers and displaceable as a unit, the larger of the diaphragms forming, in effect, a wall of the first-named chamber and the smaller diaphragm forming, in effect, a wall of the second chamber, means for operatively connecting the diaphragms to the valve as an operator for the latter, a third chamber in the housing and means for connecting said chamber to the output port, a member in the third chamber displaceable by fluid pressure from the output port, a spring continuously resisting said displacement of the member, a second spring arranged to augment the resistance to displacement of the member only after a predetermined initial displacement, a channel through said member one end of which is connected to the first-named chamber and the other end to atmosphere, a valve element in and controlling said channel, spring means tending to seat the valve element in said member, a rod extending into the last named end of the channel in engagement with the valve element for exerting force on the element in opposition to said last mentioned spring means, said rod being operatively connected to said first element and movable in response to movement of said first element, said gauge element being movable in response to passage of air through said output port.

2. In a meter, a movable measurement responsive element, an indicator gauge, and transmission means for operatively connecting the element to the gauge, said transmission means including a mechanical linkage coupled to the said element, transmitter means interposed between the linkage and the gauge for transmitting movements of said linkage to said gauge, said mechanical linkage comprising a rotatable member, a connecting link connecting said rotatable member with the movable measurement responsive element to cause rotation of said rotatable member in response to movement of said measurement responsive element at least one linearity adjustment device for correcting non-linear relation between the movements of said element and the variations in quantity which produces said movements including a first linearity adjustment means comprising a rotatably mounted calibrated disc connected to and movable with said rotatable member, connecting means connected to said calibrated disc at a point offset from the center of rotation of said disc linking said disc to said transmitter means, and means to permit rotatable adjustment of said disc relative to said rotatable member.

3. In a meter in accordance with claim 2 wherein said connecting means includes a second linearity adjustment means, said adjustment means comprising a threaded, rotatable shaft mounted on said disc extending in a direction transverse to the axis of rotation of said disc and movable therewith, a block engagable with said threaded shaft and capable of adjustment longitudinally of said shaft by rotation of said shaft, and a link depending from said block and interconnected with said transmitter means.

4. In a meter in accordance with claim 3 wherein said link is pivotally mounted and includes a rod connected to said link, depending therefrom, and connected to said transmitter, and a third adjustment means associated with said link and rod to permit longitudinal adjustment of said rod relative to said link.

References Cited by the Examiner

UNITED STATES PATENTS

| | | | |
|---|---|---|---|
| 2,433,577 | 12/1947 | Poole | 73—209 |
| 2,534,974 | 12/1950 | Jacobs | 137—85 |
| 2,556,436 | 6/1951 | Moore | 137—85 |
| 2,912,993 | 11/1959 | Jones | 137—85 |
| 3,052,254 | 9/1962 | Parks | 137—85 |
| 3,079,898 | 3/1963 | Jensen | 137—85 |
| 3,126,904 | 3/1964 | Ciarlariello | 137—85 |
| 3,137,165 | 6/1964 | Harris | 73—209 |
| 3,143,881 | 8/1964 | Booth | 73—209 |

OTHER REFERENCES

"Exhibiting and Controlling Instruments For Use With Flowrotameters"; catalog 50; Fischer and Porter Co., Hatboro, Pa., received March 28, 1951; pp. 5003 and 5005 relied upon.

RICHARD C. QUEISSER, *Primary Examiner.*

E. D. GILHOOLY, J. J. GILL, *Assistant Examiners.*